US006797870B2

(12) United States Patent
Kang

(10) Patent No.: US 6,797,870 B2
(45) Date of Patent: Sep. 28, 2004

(54) TREMOLO BLOCK DEVICE FOR GUITAR

(76) Inventor: Tae Wook Kang, 461-1, Gongneung 1-dong, Nowon-gu, Seoul (KR)

( * ) Notice: Subject to any disclaimer, the term of this patent is extended or adjusted under 35 U.S.C. 154(b) by 0 days.

(21) Appl. No.: 10/313,162

(22) Filed: Dec. 6, 2002

(65) Prior Publication Data

US 2004/0094014 A1 May 20, 2004

(51) Int. Cl.[7] .................................................. G01D 3/00
(52) U.S. Cl. ........................................................ 84/313
(58) Field of Search ............................... 84/313, 312 R, 84/290, 314 R, 314 N, 298, 299, 297 R

(56) References Cited

U.S. PATENT DOCUMENTS 6,118,057 A * 9/2000 Chang ......................... 84/298

FOREIGN PATENT DOCUMENTS

KR 20-199359 7/2000 ............ G10D/3/14
KR 20-264599 2/2002 ............ G10H/3/18

* cited by examiner

*Primary Examiner*—Kimberly Lockett
(74) *Attorney, Agent, or Firm*—Lee, Hong, Degerman, Kang & Schadeka

(57) ABSTRACT

Disclosed is a tremolo block device installed to a body of a guitar to adjust tension of strings for trill. The tremolo block device includes an upper support combined to a lower surface of a bridge plate having a plurality of saddles, a lower support hinged with the upper support, a worm installed through the lower support, a worm gear engaged with the worm and inserted into the hinge axis, and a spring inserted into the hinge to rotate with the hinge and to elastically support a lower portion of the upper support. Thus, the bridge plate is stably supported, and the body is not broken due to stress concentration. Also, a rear height of the bridge plate can be easily adjusted as well as the tension of the strings.

4 Claims, 5 Drawing Sheets

TREMOLO BLOCK DEVICE FOR GUITAR

BACKGROUND OF THE INVENTION

1. Field of the Invention

The present invention relates to a tremolo block device for a guitar, and more particularly to a tremolo block device installed to a body of a guitar to adjust tension of strings for trill.

2. Description of the Related Art

Generally, a guitar, particularly an electric guitar, has a head 1, a neck 2 and a body 3, as shown in FIG. 1.

On the neck 2, installed are strings 4, both ends of which are respectively fixed to the head 1 and the body 3. At this time, one end of the strings 4 are fixed with pegs 1*a* and poles 1*b* mounted to the head 1. The peg 1*a* is rotated to adjust tension of the string 4 for tuning. The other ends of the strings 4 are fixed to a tremolo block device 5 installed to the body 3, and the tremolo block device 5 includes a bridge plate 5*a*, a saddle 5*b* and an arm 5*c*, which are exposed outside the body 3, and various parts installed inside the body 3 to elastically support the bridge plate 5*a* to be suspended in midair.

Detailed configuration of such a conventional tremolo block device is well disclosed in 'Tail fixing device for an electric guitar' (Korean Utility Model Application No. 20-2001-0037102), 'Trilling device for a string instrument having a tuning state maintaining function' (Korean Utility Model Application No. 20-2000-0013134) and 'Guitar tremolo block device' (Korean Patent Application No. 10-1994-0011344), and not described in detail here.

To briefly describe the configuration to help understanding, the conventional tremolo block device is configured that a front of the bridge plate 5*a* is combined to and supported by the body 5 by means of a pair of fixing posts 5*d*, and a rear of the bridge plate 5*a* is unstably supported in midair while tension of the strings 4 is in balance with elastic force of springs (not shown) mounted inside the body 3. If vibrating the rear of the bridge plate 5*a* vertically by vibrating the arm 5*c* during playing the guitar, the tension of the string 4 is quickly changed, so giving a trilling effect.

However, in such a conventional tremolo block device, a side of the bridge plate 5*a* is generally fixed only through a pair of fixing posts 5*d* to the body 3 made of weak material such as woods. When playing the arming to obtain the trilling effect, stress is concentrated on the fixing posts 5*d*. Thus, if using the guitar for a long time or playing a serious arming, a portion combined with the fixing posts 5*d* can be concentrated with stress and broken.

On the other hand, to change overall tension of the strings 4, a height of the rear of the bridge plate 5*a* should be changed for setting. If changing the rear height of the bridge plate 5*a*, a front height of the saddle 5*b* supporting the strings 4 is also changed. It may give an effect of drawing or releasing the strings 4, so tension of the strings 4 are changed. If the strings 4 are set with changed tension, a playing range and a trilling range are also changed. This is a reason that players sometimes change the rear height of the bridge plate 5*a*. To change the rear height of the bridge plate 5*a* as above, in a conventional case, a user should open a cover (not shown) formed at the back of the body 3 by using such as a screwdriver and then rotates a screw (not shown) which changes tension of a spring connected to the bridge plate 5*a*. Thus, such a work is very complicate and inconvenient.

In addition, as indicated in 'Trilling device for a string instrument having a tuning state maintaining function' (Korean Utility Model Application No. 20-2000-0013134), the conventional tremolo block device has so many parts and complicated configuration. This causes difficulty in manufacturing and assembling and results in increase of costs.

SUMMARY OF THE INVENTION

The present invention is designed to solve such problems of the prior art, and an object of the present invention to provide a guitar tremolo block device in which a bridge plate is stably mounted, so preventing breakage of a body due to stress concentration even by serious arming or long time use.

Another object of the present invention is to provide a guitar tremolo block device configured that a rear height of the bridge plate can be easily adjusted from outside to change tension of strings.

Still another object of the present invention is to provide a guitar tremolo block device having the small number of parts and simple configuration, easy to manufacture and assemble, and capable of being made at low costs.

In order to accomplish the above objects, the present invention provides a tremolo block device installed to a body of a guitar so as to trill strings by adjusting tension of the strings, which includes an upper support combined to a lower surface of a bridge plate having a plurality of saddles, a lower support hinged with the upper support through a hinge axis, a worm installed through the lower support so as not to be separated from the lower support, a worm gear engaged with the worm and inserted into the hinge axis, and a spring inserted into the hinge to rotate together with the hinge and elastically supporting a lower portion of the upper support.

At this time, the hinge axis is installed through a pair of upper hinge protrusions protruded forward at both sides of the upper support and a pair of lower hinge protrusions protruded upward and spaced apart at the center of the lower support at the same time, and a bearing is inserted at a portion of the upper hinge protrusions where the hinge axis passes through.

In addition, a bushing is fit with the lower support at a position where the worm passes through, and at least one flat portion is formed respectively at a contact surface of the worm gear and the hinge axis in order to prevent slipping to a rotating direction.

In addition, the worm gear is positioned between the lower hinge protrusions, the worm is positioned between the worm gear and the upper support, and a dented worm guide groove is formed at one side of the upper support so as to ensure a space where the worm is installed.

On the other hand in the present invention, when the upper support rotates to the lower support on the center of the hinge axis, an upper end of the worm keeps a space with the upper support, and a ring groove is formed along a lower circumference of the worm positioned below the lower support and a snap ring is inserted to the ring groove in order to prevent the worm from releasing upward, and a screwed upper portion of the worm is thickly formed and supported on an upper surface of the upper support in order to prevent the worm from releasing downward.

In the present invention, there is provided a pair of springs, and each of springs is mounted between the upper hinge protrusions and between the lower hinge protrusions, and a spring support projection is formed at facing inner sides of the upper hinge protrusions in order to support the springs.

In addition, the springs are wound around an outer circumference of a spring fixing member which is combined to the hinge axis and rotates together with the hinge axis, and one end of the spring is inserted and fixed into a fixing groove formed at one end of the spring fixing member, and at least one flat portion is formed respectively at a contact surface of the spring fixing member and the hinge axis in order to prevent slipping to a rotating direction.

BRIEF DESCRIPTION OF THE DRAWINGS

Other objects and aspects of the present invention will become apparent from the following description of embodiments with reference to the accompanying drawing in which.

DESCRIPTION OF THE PREFERRED EMBODIMENT

Figure 1:
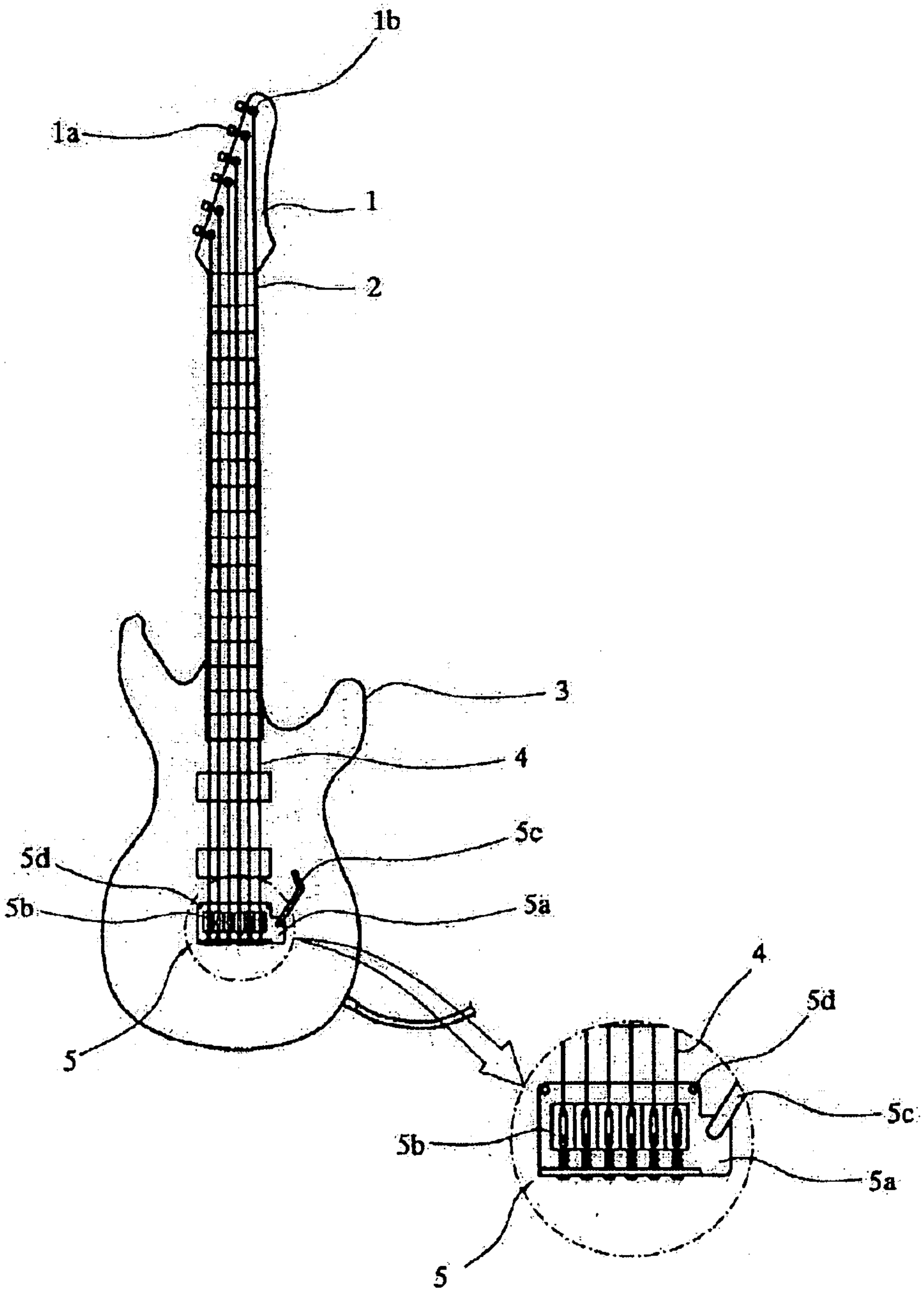
FIG. 1 is a plane view showing a general electric guitar.

Hereinafter, the present invention will be described in more detail referring to the drawings, and specific features and advantages of the present invention would be more apparent with the detailed description.

Figure 2:
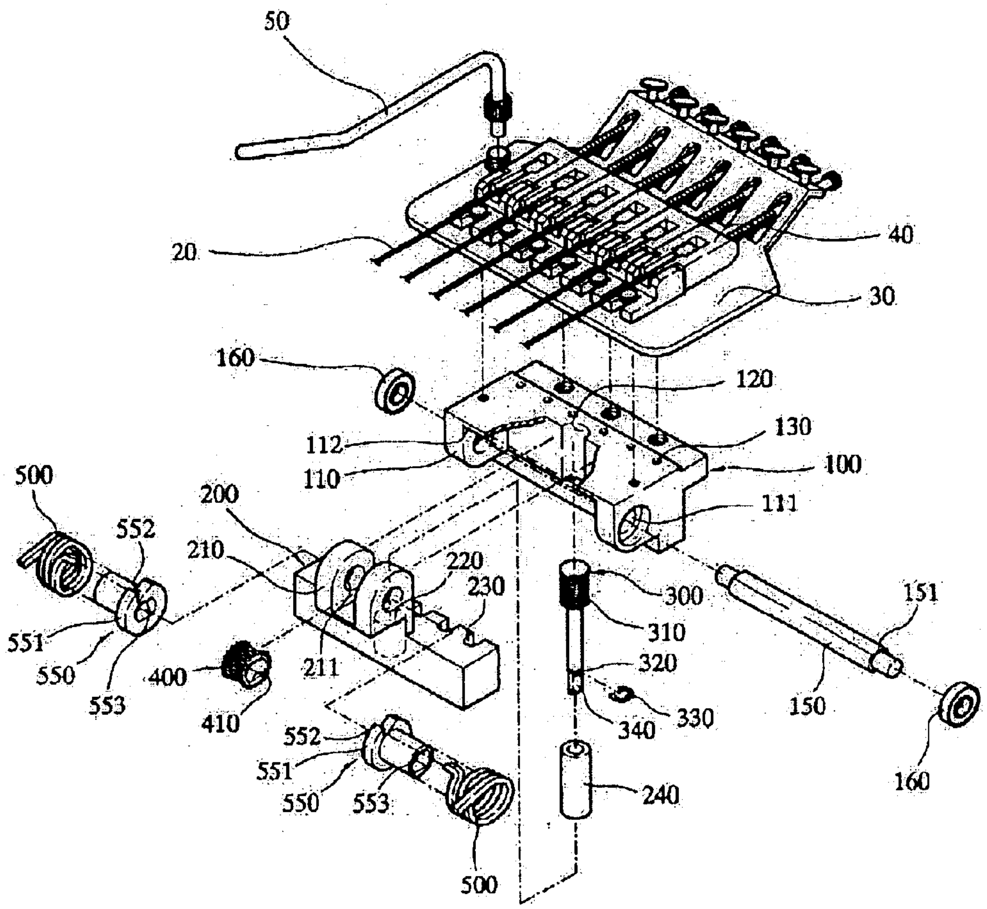
FIG. 2 is an exploded perspective view showing a tremolo block device for a guitar according to the present invention.

FIG. 2 is an exploded perspective view showing a tremolo block device for a guitar of the present invention. Referring to FIG. 2, the tremolo block device of the present invention includes an upper support 100, a hinge axis 150, a lower support 200, a worm 300, a worm gear 400 and a spring 500, and their detailed configurations are as follows.

A bridge plate 30 is combined to an upper portion of the upper support 100, and a plurality of saddles 40 are mounted at an upper portion of the bridge plate 30. One end of strings 20 are inserted and fixed downward into the saddles 40. Structure and manner for fixing the strings 20 of the present invention are similar to the conventional guitar tremolo block device, and not described in detail.

At both sides of the upper support 100, a pair of upper hinge protrusions 110 is protruded to the front, and axis holes 111 are respectively perforated at the side of each upper hinge protrusion 110 so as to be positioned in a straight line. As shown in FIG. 2, a dented worm guide groove 120 is vertically formed at a front center of the upper support 100. The worm guide groove 120 is formed to ensure a space where the worm 300 is mounted. A plurality of string holes 130 are vertically perforated at the upper support 100 so that the strings 20 fitted through the saddle 40 may be inserted thereto. Spring support projections 112 are respectively protruded at inner portions at which a pair of upper hinge protrusions 110 are faced each other, as shown in FIG. 2. The spring support projections 112 are formed so that the spring 500 may be elastically contacted and supported thereto.

The lower support 200 is positioned below the upper support 100, and a pair of lower hinge protrusions 210, each of being spaced apart, is protruded upward at the center of the lower support 200. In addition, axis holes 211 are perforated at a side of each lower hinge protrusion 210 so as to be positioned in a straight line. A worm hole 220 is vertically perforated at the lower support 200 so that the worm 300 may be mounted through the worm hole 220. A bushing 240 is separately provided and fit into the worm hole 220. A plurality of slits 230 used for inserting the strings 20 are also vertically formed to the lower support 200 at positions corresponding to the string holes 130 of the upper support 100.

The hinge axis 150 is inserted through both the axis hole 111 of the upper hinge protrusion 110 and the axis hole 211 of the lower hinge protrusion 210, as shown in FIG. 2, so that the upper support 100 and the lower support 200 are hinged each other.

Thus, if the upper support 100 and the lower support 200 are hinged by the hinge axis 150, the upper support 100 becomes rotatable within a predetermined range on the center of the hinge axis 150 against the lower support 200 fixed in the body 10. Therefore, as the bridge plate 30 combined to an upper portion of the upper support 100 rotates together with the upper support 100, a rear end of the bridge plate 30 can be lifted up or down. Since the bridge plate 30 is moved vertically using a hinge structure pivoting on the substantial hinge axis 150, the bridge plate 30 of the present invention can be mounted in a firm and stable manner rather than the conventional one.

When rotating, both ends of the hinge axis 150 combined as above are respectively inserted and supported through the axis holes 111 of the upper hinge protrusions 110. For safe and smooth rotation, bearings 160 are respectively inserted and mounted in the axis holes 111.

The worm 300 is installed through the worm hole 220 of the lower support 200. The worm 300 installed as above has a broad upper portion, on which a screw 310 is formed, in order to prevent the worm 300 from falling down and released, and a bottom of the broad upper portion is supported on an upper surface of the lower support 200 or an upper surface of the bushing 240. In addition, a ring groove 320 is formed along a lower circumference of the worm 300 positioned below the lower support 200 in order to prevent the worm 300 from lifting upward and released when the worm 300 rotates. A snap ring 330 having a 'E' or 'C' shape is combined to the ring groove 320. If the snap ring 330 is installed as above, an upper surface of the snap ring 330 is contacted with and supported by a lower surface of the lower support 200 when the worm 300 ascends, so preventing upward release of the worm 300. On the other hand, a flat combination unit 340 is formed at a lower end of the worm 300. The flat combination unit 340 is used for combining such as a peg (not shown) in order to rotate the worm 300 from outside.

The worm gear 400 engaged with the worm 300 is inserted to the hinge axis 150 and rotates together with the hinge axis 150. In such a reason, to the worm gear 400 and the hinge axis 150, at least one, for example two, flat portion 410 and 151 is (are) formed respectively at a contact surface of the worm gear 400 and the hinge axis 150 as shown in FIG. 2, in order to prevent slipping of the worm gear 400 to a rotating direction. The worm gear 400 constructed as above is positioned between a pair of lower hinge protrusions 210 and engaged with the worm 300.

On the other hand, the worm 300 installed as above is positioned between the worm gear 400 and the upper support 100 as shown in FIG. 2, and the dented worm guide groove 120 is vertically formed at a side of the upper support 100 in order to ensure a space where the worm 300 is mounted, as described above. Thus, when installed, the worm 300 is partially inserted into the worm guide groove 120 along a longitudinal direction. Though the worm 300 is installed as above, an upper portion of the worm 300 in the present invention always keeps a space with the upper support 100 when the upper support 100 rotates on the center of the hinge axis 150 against the lower support 200.

The spring 500 is inserted into the hinge axis 150 and rotates together with the hinge axis 150, and one end of the spring 500 elastically supports a lower side of the upper support 100. The spring 500 is provided in pairs, and the springs 500 are respectively positioned between the upper hinge protrusion 110 and the lower hinge protrusion 210. This spring 500 is installed so that one end is elastically contacted and supported to the spring support projection 112 elongated from facing inner sides of the upper hinge protrusions 110. Thus, the upper support 100 receives an elastic restoring forces by the spring 500 to a direction that a front portion is lifted up and a rear portion is pressed down on the center of the hinge axis 150. This elastic restoring force is balanced with tension of the strings 20 and supports the bridge plate 30 combined to the upper portion of the upper support 100 in midair when the strings 20 are installed.

On the other hand, the spring 500 can be configured that one end is directly inserted into and rotated together with a fixing groove (not shown) formed on the hinge axis 150. However in the present invention, a pair of spring fixing members 550 are separately provided, and each spring 500 is wound on outer circumference of each spring fixing member 550. A flange 551 is protruded at an outer side surface of the spring fixing member 550, and a fixing groove 552 is formed at a side of the flange 551 so that one end of the spring 500 is inserted and fixed thereto. To the spring fixing member 550 and the hinge axis 150, at least one, for example two, flat portions 553 and 151 are formed respectively at a contact surface of the spring fixing member 550 and the hinge axis 150 as shown in FIG. 2, in order to prevent slipping of the spring fixing member 550 to a rotating direction.

The tremolo block device of the present invention constructed as above is installed to the body 10 of a guitar, and its operation principle and procedures are now described with reference to FIGS. 3 to 5.

Figure 3:
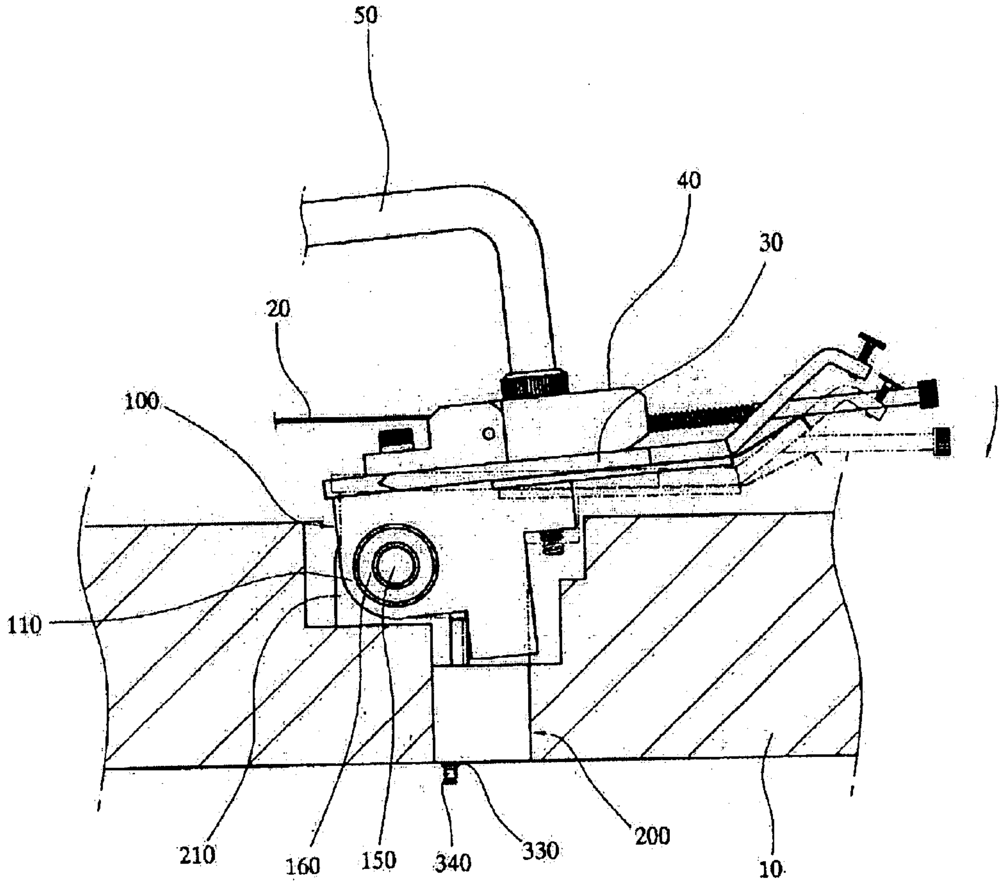
FIG. 3 shows the tremolo block device of the present invention in which strings have high tension.
Figure 4:
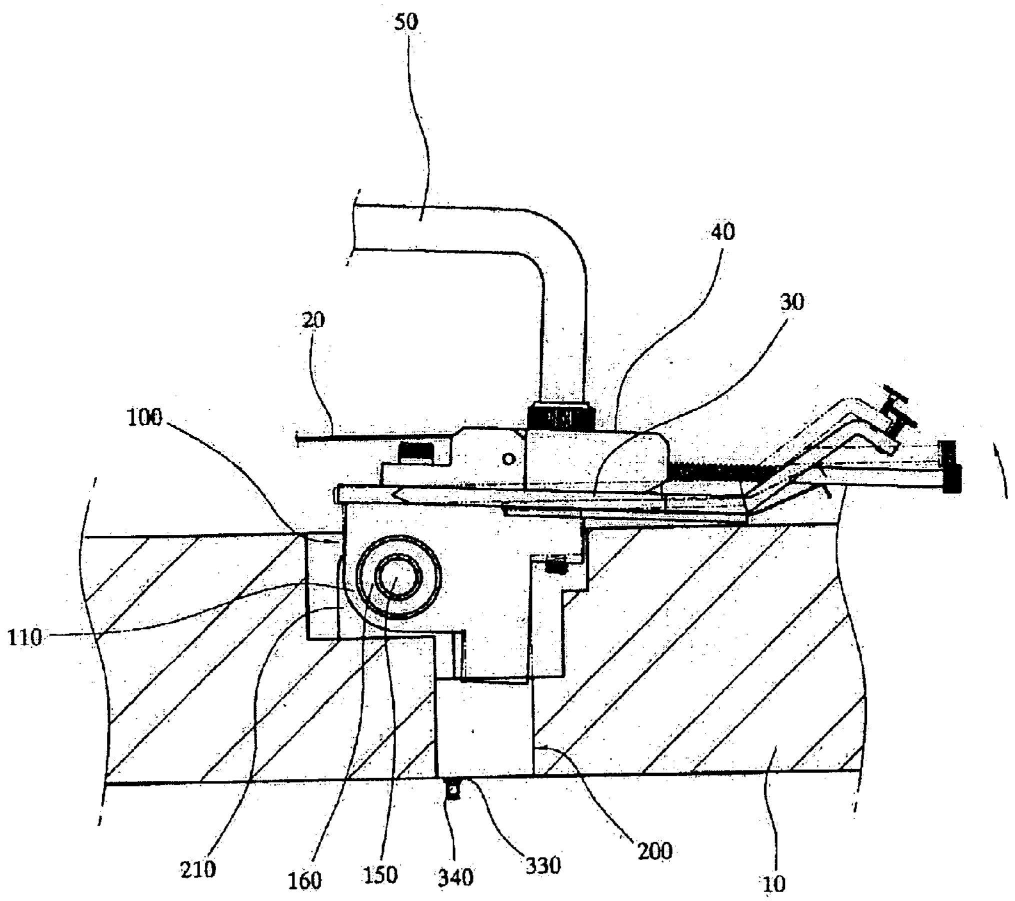
FIG. 4 shows the tremolo block device of the present invention in which strings have low tension.

FIGS. 3 and 4 show installation states of the present invention in which the strings 20 have low tension or high tension, respectively.

As shown in FIG. 3, when the strings 20 have high tension, the elastic force of the spring 500, which elastically supports a front portion of the upper support 100, is greater than the tensile force of the strings 30 lifting up a rear end of the bridge plate 30 because of strong tension of the strings 20. Thus, the bridge plate 30 is supported in a state of being slightly rotated counterclockwise on the center of the hinge axis 150, namely with its rear end slightly lifted up.

Figure 5:
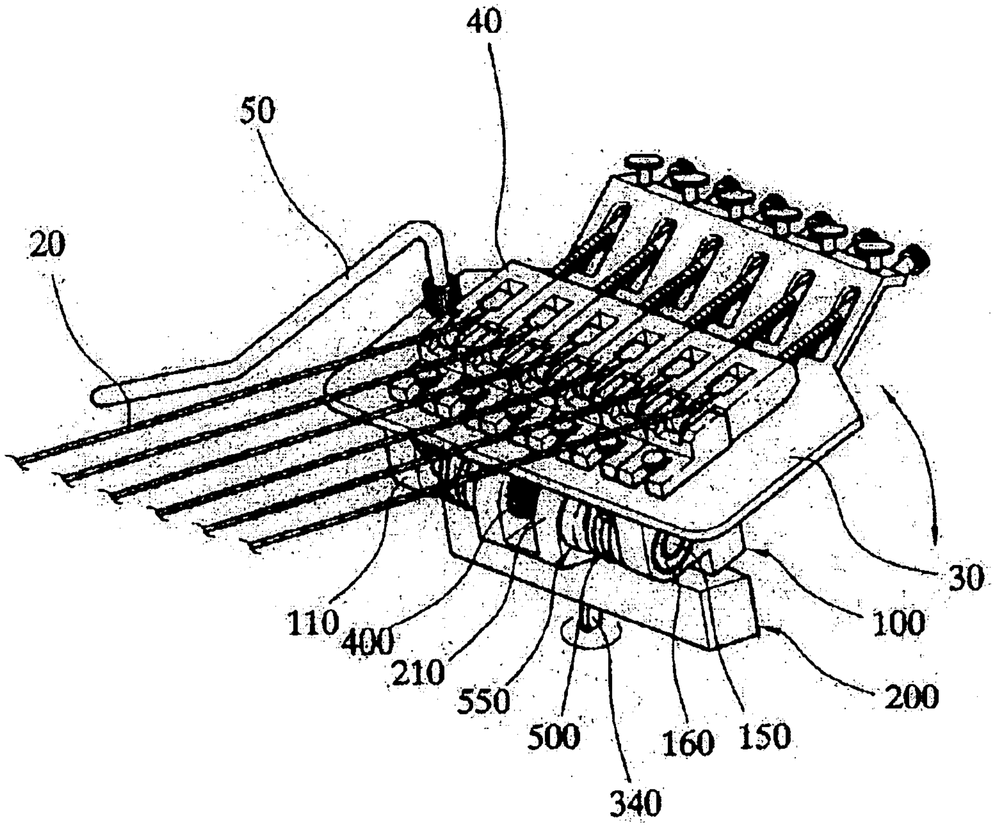
FIG. 5 is a perspective view showing the tremolo block device of the present invention in use.

In this state, if rotating the worm 300 to a side as shown in FIG. 5, the worm gear 400 engaged with the worm 300 is rotated together with the hinge axis 150. For reference, a rotating means such as a peg (not shown) for rotating the worm 300 is formed at outside of the body 10, for example at a rear side of the body 10 in the present invention. If the hinge axis 150 is rotated, the spring 500 wound around the spring fixing member 550 is rotated together. At the same time, one end of the spring 500 contacting with the spring support projection 112 of the upper support 100 is ascended and lifting up a front portion of the upper support 100. Then, as the elastic restoring force of the spring 500 supporting the front portion of the upper support 100 on the center of the hinge axis 150 becomes stronger, the front portion of the upper support 100 is lifted up, and thus the rear end of the bridge plate 30 is descended. Hidden lines in FIG. 3 well show the state that the bridge plate 30 is adjusted horizontally by rotating the worm 300 as described above. If the position of the bridge plate 30 is changed as described above, the strings 20 are pulled and the tension of the strings 20 is more increased. This makes a range of the strings 20 moved to a high tone. If vertically vibrating the bridge plate 30 against the body 10 by using the arm 50, the tension of the strings 20 is rapidly changed, and this may give a trilling effect that a tone is rapidly vibrated between a high tone and a low tone. A trill range generated in this trilling performance is moved to a higher tone then before the position adjustment of the bridge plate 30.

On the other hand, when the strings 20 have low tension as shown in FIG. 4, the elastic restoring force of the spring 500 elastically supporting the front portion of the upper support 100 on the center of the hinge 150 is greater than the tensile force of the strings 20. Thus, at this time, the upper support 100 is slight rotated clockwise against the lower support 200 on the center of the hinge axis 150, so the rear end of the bridge plate 30 keeps its descended state.

In this state, if the worm 300 is rotated in an opposite direction as shown in FIG. 5, an end of the spring 500 elastically supporting the front portion of the upper support 100 on the center of the hinge axis 150 is descended. Thus, the elastic restoring force of the spring 500 is weakened and keeps the balance with the tension of the strings 20. Then, the rear end of the bridge plate 30 is ascended and balanced as shown with hidden lines in FIG. 4. If the position of the bridge plate 30 is adjusted as above, it makes an effect of releasing the strings 20. Thus, as the tension of the strings 20 is decreased, a range of the strings 20 is moved to a low tone. At this time, the trilling range is also changed like the above case.

By using the present invention as described above, the height of the bridge plate 30 can be easily adjusted into a horizontal state by rotating the worm to a side or an opposite side from outside. In addition, it is also possible to change a performance range of the strings 20 by easily changing the tension of the strings 20.

On the other hand, though some embodiments are described above, it is apparent to those skilled in the art that the present invention can be realized in other various forms without departing from its aspect and range.

Therefore, it should be understood that the above embodiments are given by way of illustration only, not limiting one, and all embodiments specified in and equivalent to the appended claims are included in the scope of the invention.

The present invention as above gives the following effects.

First, the lower support and the upper support are firmly combined by the hinge axis in a very stable way though the bridge plate is suspended in midair by means of tension of the strings and elasticity of the spring.

Second, the lower support is stably fixed inside the body, and stress is not concentrated to damage the body since the upper plate and the bridge plate, which ascends and descends during trilling performance or tension adjustment, do not apply external force to the body.

Third, because the rear end of the bridge plate can be easily lifted up or down by rotating the worm through such as a peg formed at outside, the bridge plate can be easily adjusted into a horizontal state.

Fourth, the tension of the strings and the trilling range can be easily controlled outside.

Fifth, the smaller number of parts are needed in the tremolo block device of the present invention, so it is easily assembly with the decreased number of work procedures at a lower cost.

What is claimed is:

1. A tremolo block device installed to a body of a guitar so as to trill strings by adjusting tension of the strings, the device comprising:

an upper support combined to a lower surface of a bridge plate having a plurality of saddles;

a lower support hinged with the upper support through a hinge axis;

a worm installed through the lower support so as not to be separated from the lower support;

a worm gear engaged with the worm and inserted into the hinge axis; and a spring inserted into the hinge to rotate together with the hinge, the spring elastically supporting a lower portion of the upper support;

a pair of upper hinge protrusions protruded forward at both sides of the upper support; and a pair of lower hinge protrusions protruded upward and spaced apart at the center of the lower support, wherein the hinge axis is installed through the pair of upper hinge protrusions and the pair of lower hinge protrusions.

2. A tremolo block device according to claim 1, wherein the worm gear is positioned between the lower hinge protrusions, the worm is positioned between the worm gear and the upper support, and a dented worm guide groove is formed at one side of the upper support so as to ensure a space where the worm is installed.

3. A tremolo block device according to claim 1, wherein a ring groove is formed along a lower circumference of the worm positioned below the lower support and a snap ring is inserted to the ring groove in order to prevent the worm from releasing upward, and a screwed upper portion of the worm is thickly formed and supported on an upper surface of the upper support in order to prevent the worm from releasing downward.

4. A tremolo block device according to claim 1, wherein the spring is wound around an outer circumference of a spring fixing member which is combined to the hinge axis and rotates together with the hinge axis, and one end of the spring is inserted and fixed into a fixing groove formed at one end of the spring fixing member.

* * * * *